Aug. 9, 1960     S. P. SAVIDES     2,948,305
CONTAINERS FOR ICE CREAM PRODUCTS AND THE LIKE
Filed Nov. 19, 1957     2 Sheets-Sheet 1
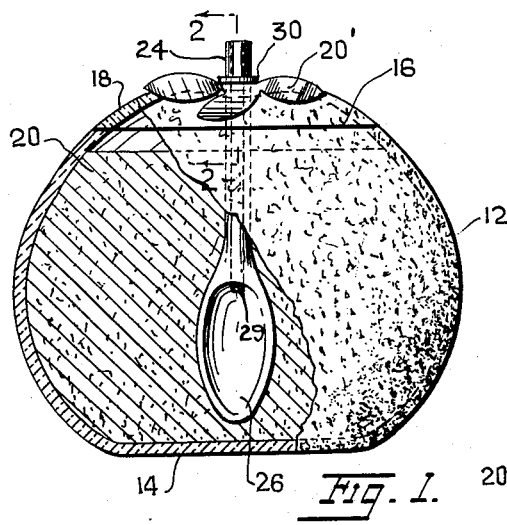
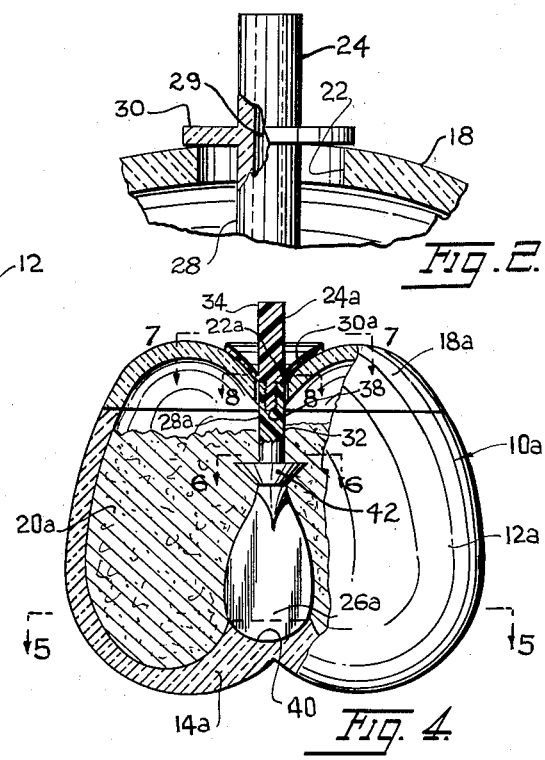
INVENTOR.
SAVAS P. SAVIDES
BY
ATTORNEY Aug. 9, 1960 S. P. SAVIDES 2,948,305
CONTAINERS FOR ICE CREAM PRODUCTS AND THE LIKE
Filed Nov. 19, 1957 2 Sheets-Sheet 2

CHERRY

APRICOT

PEAR

ORANGE

LEMON

LIME

GRAPES

PINEAPPLE

CANTELOUPE

HONEYDEW

INVENTOR.
SAVAS P. SAVIDES
BY
ATTORNEY

United States Patent Office 2,948,305
Patented Aug. 9, 1960

2,948,305

CONTAINERS FOR ICE CREAM PRODUCTS AND THE LIKE

Savas P. Savides, 92—09 Rockaway Beach Blvd., Rockaway Beach, N.Y.

Filed Nov. 19, 1957, Ser. No. 697,484

1 Claim. (Cl. 141—112)

This invention relates generally to containers. More particularly, the invention has reference to a container adapted to hold ice cream or other food products, both frozen and otherwise.

The invention has particular application to use as a container for ice cream, and it is an important object to provide an attractive container that can be used as the package in which the ice cream is sold, eleminating the necessity of packing of the ice cream in cardboard cartons, etc.

An important object, in this regard is to provide a container which can be so designed, in some forms of the invention, as to be capable of being retained after emptying of the contents, for re-use an indefinite number of times. Another object is to provide a device of the character stated which will include novel means for maintaining a lid in place upon the body of the container, said means comprising a spoon used for removing the product, with the product itself serving to anchor the spoon and, by reason of an engagement of the spoon and lid with each other, the lid itself.

It is also an object of the invention to provide a container with a lid and spoon for maintaining the lid on the container, said spoon having means to permit sipping the juices in the container outwardly of the container.

A further object is to incorporate, in one form of the invention, means on the spoon which will cause the spoon to be limited by the solidified ice cream or similar product against upward movement, in a manner such that the spoon will hold the lid in tight engagement with the open upper end of the container proper.

Another object is to provide containers for ice cream or the like which can in one form of the invention be made of permanent materials such as glass, plastic, etc., with said material, in another form of the invention, being a wholly disposable, inexpensive product.

Another object is to provide, in a device of the character stated, a shape that will be a simulation of a particular fruit, representing the flavor of the confined product, that is, one container may be shaped as a strawberry, and will hold strawberry ice cream, another container may be shaped as a peach and will hold peach ice cream, etc.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a view partly in side elevation and partly in section, illustrating a container according to the present invention.

Fig. 2 is an enlarged, detail sectional view substantially on line 2—2 of Fig. 1.

Fig. 3 is a top plan view.

Fig. 4 is a view like Fig. 1 showing a modified construction.

Fig. 5 is a horizontal section on line 5—5 of Fig. 4.

Fig. 6 is an enlarged, detail section on line 6—6 of Fig. 4.

Fig. 7 is an enlarged, detail section on line 7—7 of Fig. 4.

Fig. 8 is an enlarged, detail section on line 8—8 of Fig. 4.

Figure 9:
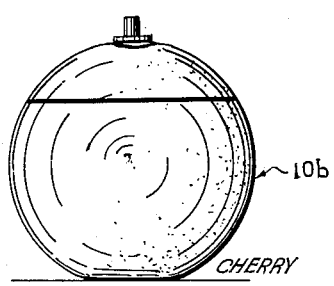
Figure 10:
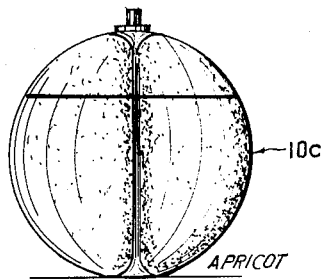
Figure 11:
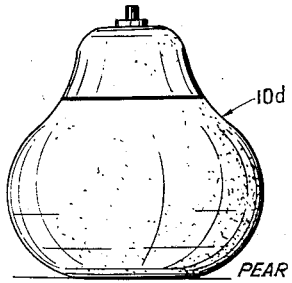
Figure 12:
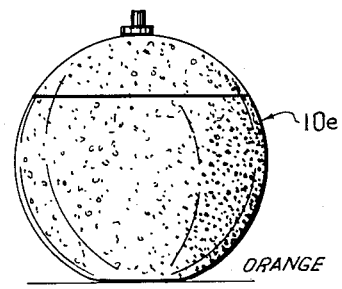
Figure 13:
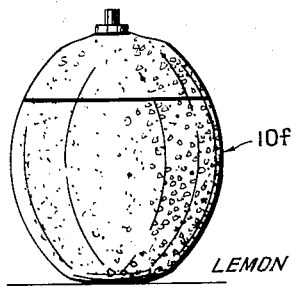
Figure 14:
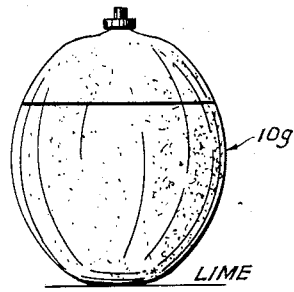
Figure 15:
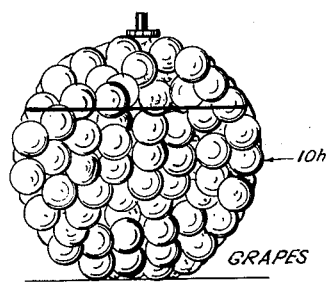
Figure 16:
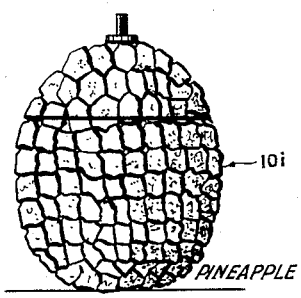
Figure 17:
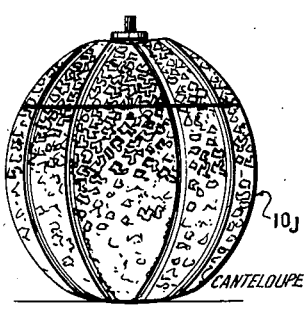
Figure 18:
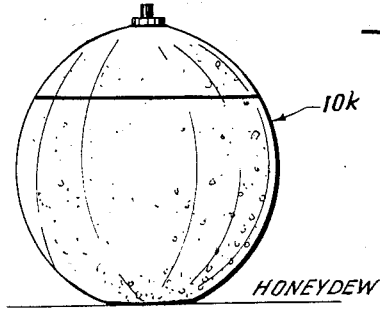

Figs. 9–18, inclusive, are side elevational views, on a reduced scale, of various modified forms of containers, in different shapes.

Referring to the drawings in detail, in Figs. 1–3 the container 10 constituting the invention includes a receptacle 12 having a shape of a particular fruit, and appropriately colored or otherwise marked on its outer surface to more faithfully simulate the fruit. Thus, in Figs. 1—3 the container is in the shape of a strawberry, and would be, of course, colored red and have exterior markings and identations intended to closely duplicate the actual markings and indentations of a strawberry. In any event, the receptacle 12 has a bottom 14 which is flattened sufficiently to impart stability to the device upon a suitable surface, and the receptacle 12 is progressively reduced in a direction upwardly from a location intermediate its upper and lower ends, with the portion of lowest cross-sectional area being the open upper end 16 of the rectacle.

The receptacle, as well as the lid 18 closing the same, is formed of glass in the illustrated example. However, it may be formed of an inexpensive, molded plastic, or it could even be formed of a cardboard or other disposable material. Except as necessarily required by the scope of the appended claim, it is not desired that there be any limit placed upon the particular materials that could be used.

In any event, the receptacle 12 is adapted to hold a quantity of ice cream 20, with the ice cream filling the receptacle to a level slightly below the upper end 16. The lid 18 is of upwardly concavo-convex formation, and exteriorly is shaped to constitute an extention of the surface of the receptacle, so that the lid and the receptacle together form the simulation of the strawberry. The lid, in fact, is molded and painted to include simulated leaves 20', centrally thereon, and in the central portion of the lid there is formed a circular opening 22 adapted to receive a spoon 24. The opening 22 is of a diameter sufficient to permit the bowl portion 26 of the spoon to pass through the opening 22.

The stem 28 of the spoon is circular in cross-section and is formed with an axial passage 29 which extends therethrough and communicates at its inner end with the open faced bowl 26 of the spoon as shown in Fig. 1. A flat collar 30 is formed integrally upon the upper end portion of the stem, lying in a plane perpendicular to the length of the stem and formed to a diameter slightly greater than that of the opening 22. Therefore the collar bears against the edge portion of the opening, so as to hold the lid 18 firmly against the upper end 16 of receptacle 12.

In use, the spoon is inserted through the lid, and is then inserted in the ice cream 20, while the ice cream is still in a fluid state. As the ice cream freezes, it solidifies about the spoon, holding the spoon against upward movement. As the collar 30 bears against the lid, the lid itself is held against upward movement. The solidified product itself serves as a means engaging the spoon against upward movement. As the product is to be consumed, the lid is readily removed in view of the fact that the strong pull exerted by the user will be sufficient to dislodge the spoon from the ice cream, thus to permit extraction of the spoon through the opening 22, and, as a result, permit ready removal of the lid.

Upon melting of the ice cream, the fluid cream may be sipped through the stem 28, the stem serving as a straw. The bowl 26 of the spoon may be turned to facilitate withdrawal of the fluid by sipping.

In Figs. 4-8 there is shown a modified construction wherein the container 10$^a$ includes a receptacle 12$^a$ in the form of a peach to hold peach ice cream 20$^a$. In this arrangement the lid 18$^a$ is held in position by a collar 30$^a$ of a spoon 24$^a$ having a bowl 26$^a$. The lid has an opening 22$^a$ through which the stem 28$^a$ of the spoon extends.

In this form of the invention, the spoon is formed of plastic and is sectionally constituted, so that the stem 28$^a$ includes a lower or main portion 32 and an upper portion 34, with the collar 30$^a$ being formed upon the lower extremity of the upper portion. The upper portion has a reduced, axial, depending, threaded extension 36 engageable in a complementary, threaded recess 38 of the body portion 32 of the stem 28$^a$.

Formed in the bottom wall 14$^a$ of the receptacle is a slot 40, opening upwardly and proportioned to receive the lower end or tip of the bowl 26$^a$ of the spoon. Thus, the lower or main portion 32 of the spoon is held against rotational movement but is not held by the slot against upward movement.

Integrally formed upon the main portion 32 of the spoon is a concavo-convex collar or flange 42, having its convex face disposed as its underside. Thus, flange 42 has a dished top surface and when the ice cream solidifies about the spoon, the ice cream disposed about the stem of the spoon above the flange 42 will serve as a means that will strongly limit the spoon against accidental upward movement.

In use of this form of the invention, the spoon is first deposited in the empty container, and will be held in an upright position by engagement of the spoon bowl in the slot 40. The ice cream is poured into the container and solidifies when chilled, so that the spoon is firmly embedded in the ice cream.

Then, the lid is placed in position with the upper end of the body portion 32 of the spoon disposed in opening 22$^a$ of the lid. Then, the top portion 34 is extended into the opening 22$^a$ and is threadedly engaged in the recess 38. The result is that the collar 30$^a$ is brought to bear firmly against the lid, forcing the lid into sealing engagement with the receptacle.

In Figs. 9-18 there are shown containers 10$^b$, 10$^c$, 10$^d$, 10$^e$, 10$^f$, 10$^g$, 10$^h$, 10$^i$, 10$^j$, and 10$^k$, respectively. These are respectively in the simulations of a cherry, apricot, pear, orange, lemon, lime, grape, pineapple, cantaloupe, and honeydew. Each of these containers has the same characteristics as the containers shown in Figs. 1 and 4, that is, the containers in Figs. 9-18 each has a spoon and lid and receptacle construction as shown in Fig. 1 or alternatively, a spoon, receptacle, and lid interengagement of the kind shown in Fig. 4. Each holds, of course, ice cream of the particular flavor represented by external simulation of the container.

The container could be in other forms, as for example, in the form of pies and similar products, to hold a corresponding food. Still further, the container could hold sherbets, frappes, ices, cakes, etc.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A container of the class described comprising an upwardly opening receptacle shaped in simulation of a particular fruit, a lid thereon, said lid having an opening, and a spoon including a collar overlying the lid to hold the same in engagement with the receptacle, said spoon extending through said opening, said collar rigid with the adjacent portion of the spoon, said collar in concentric relation to said opening, and formed to a diameter greater than that of the opening so as to bear against the edge portion of the opening while completely closing the opening, said spoon being of sectional formation, and including a main portion formed with a bowl and an upper portion, the upper portion having a threaded extension and the main portion having a threaded axial recess receiving said extension, the main portion formed with an annular flange, adjacent the bowl, whereby a solidified product within the receptacle will bear against the flange to hold the spoon against upward movement, in a position in which the collar of the spoon bears against the lid, the receptacle having a bottom wall the inner surface of which has a slot in which the bowl removably engages to hold the lower portion of the spoon against rotation during threading of the upper portion into and out of the recess, said spoon occupying the position of a core of a particular fruit.

References Cited in the file of this patent

UNITED STATES PATENTS

| D. 130,876 | Reid | Dec. 23, 1941 |
| 98,511 | Mead | Jan. 4, 1870 |
| 204,930 | White | June 18, 1878 |
| 259,740 | Ams | June 20, 1882 |
| 1,652,585 | Schreiber | Dec. 13, 1927 |
| 1,834,085 | Bloom | Dec. 1, 1931 |
| 1,952,813 | McDowell | Mar. 27, 1934 |
| 2,175,735 | Banks | Oct. 10, 1939 |
| 2,485,303 | Marcus | Oct. 18, 1949 |